June 21, 1960

K. D. GARNJOST 2,941,515

DUAL INPUT SERVO VALVE

Filed Feb. 13, 1956

INVENTOR.
Kenneth D. Garnjost
BY
Popp and Sommer

ATTORNEYS

United States Patent Office 2,941,515
Patented June 21, 1960

2,941,515

DUAL INPUT SERVO VALVE

Kenneth D. Garnjost, West Falls, N.Y., assignor to Moog Servocontrols, Inc.

Filed Feb. 13, 1956, Ser. No. 564,988

14 Claims. (Cl. 121—46.5)

This invention relates to a dual input servo valve, that is, a servo valve responsive to two inputs, one of a mechanical nature and the other producing a hydraulic input.

As is conventional with servo valves, the dual input valve of the present invention has actuating ports adapted by the position of a valve spool to be placed alternately and to a variable degree in communication with inlet and outlet ports, for supplying and receiving fluid to and from external hydraulic machinery to be actuated. The extent to which such inlet and outlet ports on the one hand are placed in communication with the actuating ports on the other hand will determine the output flow rate of the servo valve and hence the operation of the hydraulic machinery. In accordance with the present invention, the actuation of the hydraulic machinery can be made responsive to the algebraic sum of the hydraulically and mechanically induced displacements of the valve spool.

While the hydraulic input to the valve spool may be induced in any suitable manner, it is preferred to electrically induce such input, and particularly by an electrically controlled hydraulic amplifier which produces and applies a pressure differential to the opposite ends of the valve spool so that the hydraulic drive on the valve spool is proportionate to the electrical signal applied to the hydraulic amplifier. In this manner, a servo valve can be made responsive to a mechanical input and also responsive simultaneously to the strength and sense of an electrical input signal.

In such a preferred embodiment, the dual input servo valve of the present invention finds particularly useful and advantageous application in aircraft control systems for controlling a movable surface element of the aircraft such as a rudder, elevator or aileron, although it is to be clearly understood that the invention is not limited to this field and is equally applicable in other fields and to other uses. Considering now the preferred embodiment, since one of the dual inputs is a mechanical displacement of the valve spool and the other an electrical signal which produces a proportionate hydraulic displacement of the valve spool, the output flow rate of the servo valve in its actuating ports is proportionate to the algebraic sum of the two inputs. A major decrease in the weight, size and complexity of airplane control systems is therefore made possible by the servo valve of the present invention since such valve can directly sum two inputs, one mechanical and the other electrical, the valve spool being positioned proportionate to the sum of the two inputs.

My novel dual input valve is suitable for either single or dual hydraulic systems. If desired, auxiliary features such as shut-off valves and a mechanical input lock-out with direct pilot override can be included. If such features are incorporated in the design of the servo valve, three distinct flight regimes or modes of operation are provided as follows:

(1) a purely mechanical-hydraulic surface control valve, (2) a mechanical-hydraulic surface control valve with incremental surface control from an electro-hydraulic input for stability augmentation, and (3) a purely electrical surface control valve.

Suitable valve means such as solenoid valves, can be included for the purposes of switching from one regime to another. When the servo valve is operating in the purely mechanical input regime, the pressure supplied to the hydraulic amplifier is cut off by a solenoid valve. Under these conditions, the valve spool position is set soley by the mechanical displacement input. When it is desired to go from operation in the purely mechanical regime to operation in the mechanical control plus electrical stabilization regime, the hydraulic amplifier is pressurized by opening the shut-off solenoid valve and the valve spool is responsive both to mechanical displacement and electrically induced hydraulic drive forces. In order to operate in the fully electrically controlled flight regime, means are provided for eliminating the mechanical input by a lock-out mechanism which may be rendered operative by energizing a solenoid valve.

When the supply of pressurized fluid to the hydraulic amplifier is shut off, as by the solenoid shut-off valve, the servo valve spool is actuated solely by the mechanical input. However, when the lock-out solenoid valve is operated so as to render the lock-out mechanism or device operative, the mechanical input mechanism is returned to a predetermined position and maintained in such position so that the servo valve spool is actuated solely by the hydraulic pressure drive created by the electrical signal to the hydraulic amplifier. With the mechanical input lock-out engaged, the electrical signal becomes a full authority system for full maneuvering operation of the aircraft.

Mechanical override is incorporated with the mechanical lock-out system in order to permit the pilot to regain direct mechanical control of the aircraft during the full electrical authority flight regime by overpowering the lock-out device.

Other objects and advantages of the present invention will be apparent from the following detailed description and accompanying drawings wherein.

Figure 1:
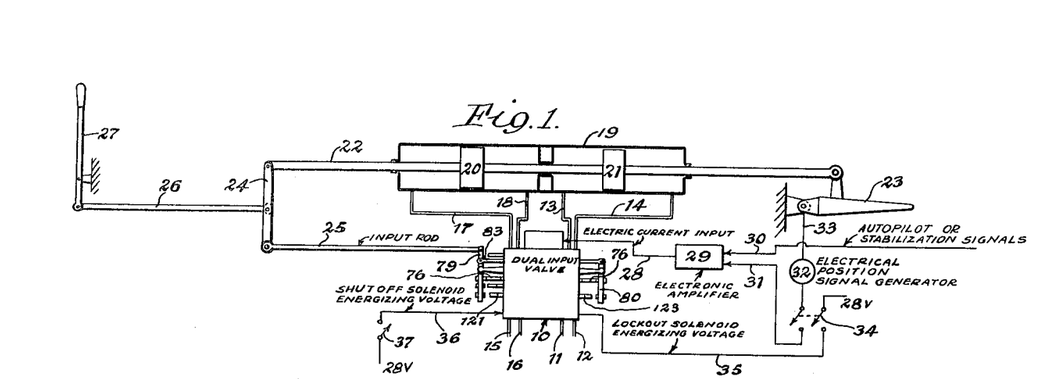
Fig. 1 is a diagrammatic representation of an aircraft control system which incorporates the dual input servo valve forming the subject of the present invention, such valve being of the preferred form so as to be subject to a mechanical input and also to an electrical input and capable of producing an output flow rate proportionate to the algebraic sum of the two inputs.

Referring to Fig. 1, the numeral 10 represents generally the dual input servo valve of the present invention and adapted for dual hydraulic systems. The primary hydraulic system has pressure and return lines 11 and 12, respectively, and the valve 10 controls the flow of fluid from such system through the primary actuating lines 13 and 14. The secondary pressure hydraulic system includes the secondary pressure and return lines 15 and 16, respectively, and the valve 10 controls the flow of fluid from said secondary hydraulic system through the secondary actuating lines 17 and 18. The various actuating lines 13, 14, 17 and 18 are connected to hydraulic machinery illustrated as a cylinder 19 in which two pistons 20 and 21 are arranged. These pistons are in separate chambers within the cylinder 19 but are both fast to a rod 22. One end of this rod 22 is suitably connected to a movable surface element 23 of the aircraft to be controlled. The other end of the rod 22 is shown as pivotally connected to the upper end of a floating beam 24. The lower end of this beam 24 is pivotally connected to an input rod 25 for the valve 10. Intermediate its ends, the beam 24 is pivoted to one end of a rod 26, the other end of which is shown as being pivoted to the lower end of a manual control member 27.

The input rod 25 is shown as connected to a parallelogram linkage which will be described in greater detail hereinafter. For present purposes, such linkage applies a mechanical displacement input to the servo valve 10 in proportionate response to movement of the input rod 25.

The electrical signal input to the servo valve 10 is schematically illustrated in Fig. 1 as being applied by the electrical input line 28. This line 28 leads from an electrical amplifier 29 of any suitable type. Electrical signals from an autopilot (not shown) or stabilization device (not shown) are fed into the electrical amplifier through the electrical line 30. Another electrical line 31 is also shown in Fig. 1 for feeding in additional electrical signals derived from an electrical position signal generator 32 which may be of any suitable type. The signal generator 32 is responsive to the position of the control surface element 23 and its connection therewith is schematically illustrated by the line 33.

The numeral 34 represents a double switch, one blade of which and its contacts are arranged in the electrical line 31, and the other blade of which and its contacts are arranged in still another electrical line 35 which is suitably connected to the standard 28 volt electrical supply system of the aircraft. The electrical line 35 feeds the energizing voltage for the lock-out solenoid valve, later to be described, incorporated in the servo valve 10. The servo valve 10 also incorporates a shut-off solenoid valve, later to be described, the energizing voltage for which is fed to the valve through the electrical line 36 in which a switch 37 is arranged. The line 36 is connected with the aforementioned standard 28 volt electrical supply system of the aircraft. The foregoing describes briefly the environment of the dual input servo valve 10 in its application to an aircraft control system.

With the flight regime set up for purely mechanical control of the control surface element 23, the arrangement shown in Fig. 1 will provide a suitable mechanical input and feedback to the servo valve 10. With the flight regime set up for purely electrical input to the servo valve 10, the electrical position signal generator 32 will feed back an electrical signal to buffer that applied by the autopilot. With the flight regime set up for a combination of mechanical and electrical inputs to the servo valve 10, there is a mechanical feedback to the servo valve.

Figure 3:
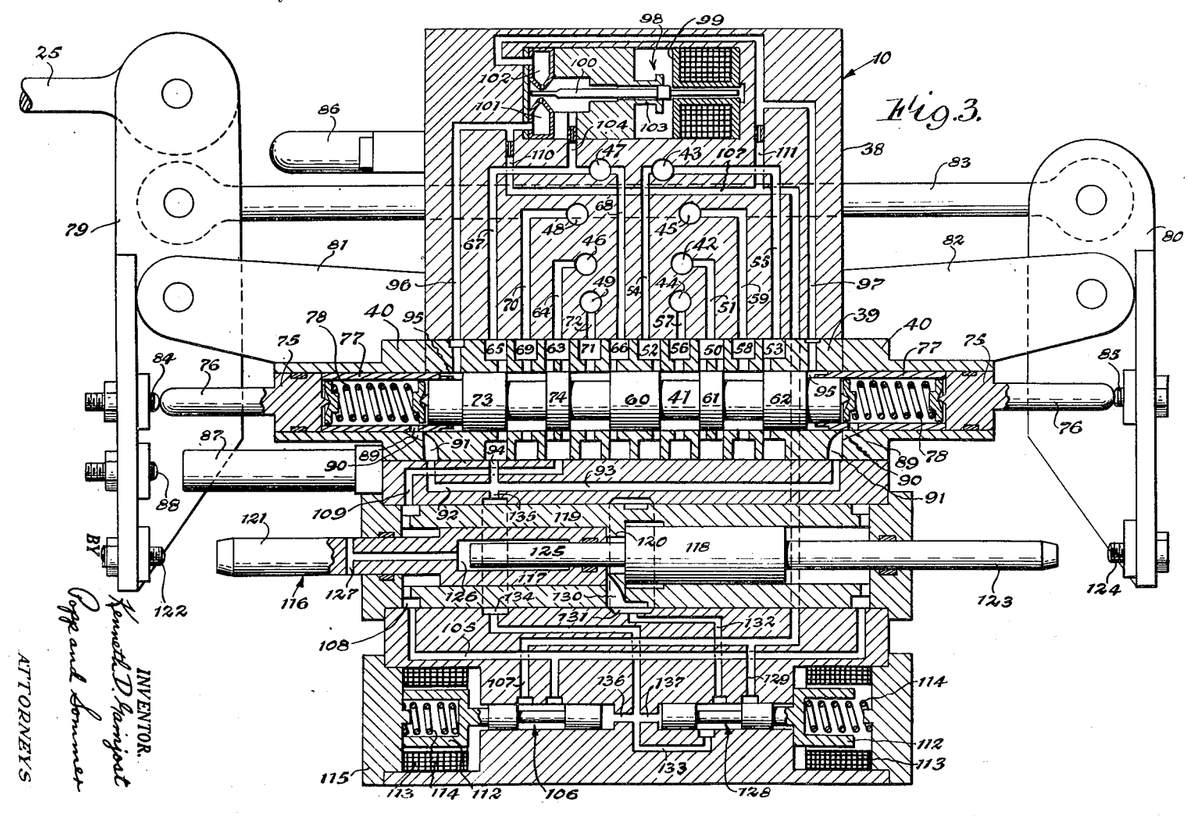
Fig. 3 is a vertical central sectional view through the dual input servo valve shown in Fig. 1 and illustrating the internal construction of the valve in a more or less diagrammatic manner and further set up for response to two inputs, one a mechanical and the other an electrical.

Turning now to a detailed explanation of the dual input valve 10 shown in Fig. 3, the valve, suitable for dual hydraulic systems, has a body 38 provided with a cylindrical bore which extends completely therethrough. Arranged within this bore is a valve bushing 39 held in position within the body by end caps 40, 40 at opposite ends of the bushing. The bores of the bushing and end caps 40 provide a chamber in which a valve spool indicated generally at 41 is slidably arranged. The valve spool is shown as comprised of two separate and independent four-way valve sections fabricated integrally on the same valve spool shaft. The left hand half portion or section of the valve spool controls the secondary hydraulic system and the right hand half portion of the valve spool controls the primary hydraulic system. For each hydraulic system there are four ports, namely, a pressure port, a return port and two actuating ports. For the primary hydraulic system the pressure port is shown at 42, the return port at 43 and the actuating ports at 44 and 45. The corresponding ports for the secondary hydraulic system include a pressure port 46, a return port 47 and two actuating ports 48 and 49.

The periphery of the bushing 39 is formed with annular grooves which communicate with the several ports. Thus, for the primary hydraulic system the pressure port 42 communicates with the annular groove 50 via the channel 51; the return port 43 communicates with the annular grooves 52 and 53 via the channels 54 and 55 respectively; the actuating port 44 communicates with the annular groove 56 via the channel 57; and the other actuating port 45 communicates with the annular groove 58 via the channel 59. The various annular grooves 52, 56, 50, 58 and 53 for the primary hydraulic system have communication with the bore of the bushing 39 through respective radial passages so that the bore of the valve bushing has corresponding inlet, outlet and actuating ports for receiving and supplying fluid from and to the external hydraulic machinery to be actuated. The right hand half portion or section of the spool shaft 41 has lobes 60, 61 and 62, so positioned on this shaft as to cover the inlet and outlet ports when the valve spool is in a centered or neutral position, as shown in Fig. 3.

With respect to the left hand half portion or section of the valve spool 41 which services the secondary hydraulic system, the bushing 39 is similarly provided with a series of annular grooves which communicate with the various ports for this hydraulic system. Thus, the pressure port 46 communicates with the annular groove 63 via the channel 64; the return port 47 communicates with the anular grooves 65 and 66 via the channels 67 and 68 respectively; the actuating port 48 communicates with the annular groove 69 via the channel 70; and the other actuating port 49 communicates with the annular groove 71 via the channel 72. The various annular grooves 65, 69, 63, 71 and 66 communicate with the bore of the bushing 39 via radial passages which provide the corresponding inlet, outlet and actuating ports in the bore wall of the bushing. These ports are shown as being covered by lobes 73, 74 and the left hand portion of the central lobe 60 on the valve spool 41.

Figure 2:
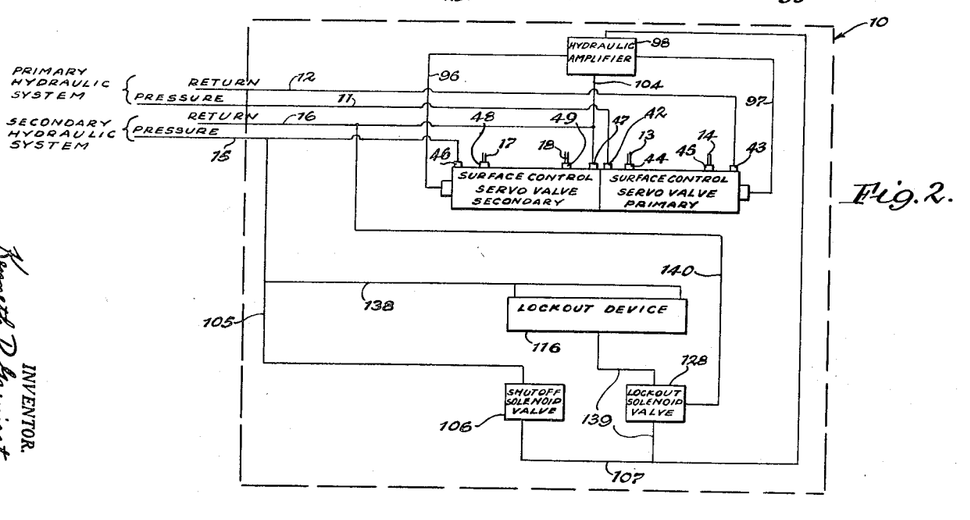
Fig. 2 is a hydraulic flow diagram of the hydraulic circuit of the dual input servo valve shown in Fig. 1.

At this time the various ports of the two hydraulic systems will be related to the lines shown in Figs. 1 and 2. With respect to the primary hydraulic system, the pressure line 11 connects with the port 42; the return line 12 with the port 43; the actuating line 13 with the port 44; and the actuating line 14 with the port 45. With respect to the secondary hydraulic system, the pressure line 15 connects with the port 46; the return line 16 with the port 47; the actuating line 17 with the port 48; and the actuating line 18 with the port 49.

The radial valve metering orifices arranged in the bushing 39 and leading to the valve spool chamber thereof are rectangular slots so that displacement of the valve spool 41 in either direction from its centered or neutral position shown, and to the extent of displacement, will place the various actuating ports in each hydraulic system in communication with the pressure and return ports of the corresponding hydraulic system in a predetermined manner. In this way displacement of the valve spool controls actuation of the external hydraulic machinery which in Fig. 1 is shown as the cylinder 19 and two pistons 20 and 21.

The chamber of the valve bushing 39 as extended by the bores of the end caps 40 is shown as closed at its opposite ends by movable members or plugs 75, 75. Each of the members 75 is in the form of a piston having an outwardly extending stem 76 and an inwardly extending sleeve 77. The inner end of each sleeve 77 is shown as slidably receiving the corresponding end portion of the valve spool shaft. In the space provided between each member 75 and the corresponding end of the valve spool 41 is a compression spring 78. The springs 78 are preloaded and serve to return the valve spool 41 to a predetermined or centered position with respect to the movable members 75.

Means are provided for sliding the members 75 in the same direction and a like distance whereby the valve spool 41 can be moved from its neutral position and hence driven mechanically. Such means are shown as including a parallelogram linkage including a pair of levers 79 and 80. The lever 79 is pivoted intermediate its ends on the outer end of a bracket 81 suitably mounted on the valve body 38. The lever 80 intermediate its ends is pivoted on the outer end of a similar bracket 82 arranged on the opposite side of the valve body. The levers 79 and 80 above their pivotal mountings on the brackets 81 and 82 are connected together by a tie rod 83. The ends of the tie rod 83 have a suitable pivotal connection with the levers 79 and 80. Inasmuch as the horizontal spacing between the pivots for the tie rod 83 is the same as the horizontal spacing between the bracket pivots, and further in view of the fact that the spacing between adjacent pivots on each side of the linkage is the same, a movable parallelogram linkage is provided. This parallelogram linkage is shown as actuated by the input rod 25 having a suitable pivotal connection with the upper extremity of the lever 79.

The stems 76 of the movable members 75 closing the ends of the valve chamber have abutting engagement severally with adjustable abutments 84 and 85 carried respectively by the levers 79 and 80 below their pivots on the brackets 81 and 82. With this arrangement it will be seen that shifting the position of the input rod 25 will shift the parallelogram linkage so that the movable members 75 can be shifted axially of the alined bores of the bushing 39 and end caps 40 in the same direction and a like distance. So shifting the movable members 75 operates to shift the valve spool 41 and spool end springs 78. In other words, a displacement of the input rod 25 produces, through the parallelogram linkage, a proportionate displacement of the movable members 75, spring 78 and valve spool 41 as a unitary assembly. The extent to which the linkage can be shifted in either direction from the centered position shown in Fig. 3 is limited by stops 86 and 87. These stops are suitably mounted on the valve body above and below the pivot for the lever 79, projecting outwardly from the body, and are so arranged that their outer ends are adapted to abuttingly engage the lever. Thus, if the lever 79 is swung in a clockwise direction as shown in Fig. 3, it will engage the stop 86 and when swung in a counter-clockwise direction it will engage the stop 87. An adjustable abutment member 88 is carried by the lever 79 and this member is adapted to engage the outer end of the lower stop 87.

During axial displacement of the valve spool 41, fluid can leave and enter the spool end chambers in which the springs 78 are arranged. For this purpose, the sleeve 77 of each movable member 75 is shown as having a radial channel 89 which is adapted at all times to remain in communication with a slot 90 in the corresponding end cap 40. The slot 90 in turn is in constant registry with a channel 91 formed as a recess in the end of the valve bushing 39. The channels 91 at opposite ends of the bushing 39 are connected by channels 92, 93 and 94, the latter of which communicates with the annular groove 65. Since this groove 65 is in constant communication with the return port 47 of the secondary hydraulic system, it will be seen that the spring chambers are always connected to a common drain and associated solely with the secondary hydraulic system.

At each end of the valve spool 41 there exists a fluid drive chamber 95 between the spool and adjacent sleeve 77 of the corresponding movable member 75. The inner end of the left chamber 95 is defined by the outwardly facing radial surface of the lobe 73 at the left hand end of the valve spool. The right chamber 95 at the opposite end of the valve spool is defined at its inner end by the outwardly facing radial surface of the lobe 62. The chambers 95 are annular, as are the corresponding surfaces of the lobes 73 and 62. Fluid channels are provided for conducting fluid to and from the chambers 95. In the case of the chamber 95 at the left hand end of the valve spool such channel is indicated at 96. The corresponding channel for the chamber 95 at the right hand end of the spool is indicated at 97.

Electrically controlled hydraulic amplifier means are associated with the channels 96 and 97 to control the flow of drive fluid through such channels which lead to the fluid drive chambers 95, and hence control the hydraulic drive of the valve spool 41. Preferably, such electro-hydraulic input means are arranged to produce an output pressure differential proportionate to the electrical signal applied to such means. This pressure differential is established in the fluid channels 96 and 97 to drive the valve spool. Means of this preferred type are shown in Fig. 3 and are represented generally by the numeral 98. Such means comprise a solenoid or torque motor 99 adapted to move a pressure regulator member 100. A pair of nozzles 101 and 102 are arranged on opposite sides of that end of the pressure regulator member 100 remote from the torque motor 99. The pressure regulator member intermediate its ends is mounted on a flexure tube 103. The position of the pressure regulator member 100 with respect to the discharge openings of the nozzles provides variable annular orifices which develop a pressure differential within the nozzle chambers. The interiors or chambers of the nozzles 101 and 102 are shown as being directly connected to the fluid channels 96 and 97, respectively.

The hydraulic amplifier 98 may be of the dry solenoid type, schematically shown herein but fully described in the application of William C. Moog, Jr., Serial No. 560,573, filed Jan. 23, 1956, and entitled Fluid Control Valve. Instead of the dry solenoid type, an immersed solenoid type may be employed, as fully described in Moog Patent No. 2,767,689. Both such types of electro-hydraulic amplifiers are of the balanced nozzle design and provide an output pressure differential, utilized to drive the valve spool 41, proportionate to the electrical signal applied to the solenoid or torque motor.

Means are provided for supplying the electro-hydraulic amplifier 98 with fluid derived from the secondary hydraulic system and also the fluid discharged by the nozzles 101 and 102 is drained to the return line of such system. The return channel 104, having a restriction therein, is shown as leading from the chamber into which the nozzles discharge their fluid to the channel 67 which, in turn, is connected with the return port 47 of the secondary hydraulic system.

Referring to Fig. 2, the fluid supply means for the electro-hydraulic amplifier 98 includes an inlet line 105 branching from the secondary pressure supply line 15, a shut-off solenoid valve 106 spring loaded in the off direction, and an outlet line for this valve indicated at 107 and leading to the amplifier. Referring to Fig. 3, the shut-off solenoid valve 106 is shown energized to move a two-lobed spool, slidably arranged in a bore provided in the valve body 38, to an on position so as to establish communication between the outlet line or channel 107 and the inlet line or channel 105. The channel 105 is shown as communicating with an annular chamber 108 provided in the valve body. This chamber 108 is connected to annular groove 63 by the fluid channel 109. Thus, the pressurized fluid admitted to the pressure port 46 of the secondary hydraulic system is conducted to the shut-off solenoid valve 106 through the channel 64, annular groove 63, channel 109, annular chamber 108 and channel 105. When the solenoid valve 106 is energized as shown in Fig. 3, the pressurized fluid admitted to this valve can pass through the channel 107 and its branch channels 110 and 111, each with a restriction therein, leading to the channels 96 and 97 respectively, and thence to the nozzles 101 and 102 of the electro-hydraulic amplifier 98.

The shut-off solenoid valve 106 may be of any suitable construction, that shown being merely illustrative of one suitable design. The cup-shaped plunger 112 to which the slide valve is integrally connected is surrounded by a solenoid coil 113 and a return spring 114 is shown as being operatively interposed between a cover 115 and the base of the plunger 112. As explained above, the coil 113 is shown as energized in Fig. 3 so that the shut-off valve spool has been pulled to the left as viewed in this figure thereby establishing communication between the channels 105 and 107.

Thus, with the solenoid valve 106 open as shown, pressurized fluid from the secondary hydraulic system can be supplied to the electro-hydraulic amplifier 98. An electrical input signal to this amplifier will actuate the same so as to produce a pressure differential in the fluid channels 96 and 97 which lead to the hydraulic drive chambers 95 at opposite ends of the valve spool 41. The direction of hydraulic drive will depend upon the sense of the electrical input signal to the amplifier 98 and the extent of hydraulically induced displacement of the valve spool is dependent upon the magnitude of the pressure differential which, in turn, is proportionate to the strength of the electrical input signal. The springs 78 provide a force balance with the hydraulic drive.

It is to be noted that the maximum movement of the valve spool 41 from the centered position shown in Fig. 3 in either direction is limited by engagement of one or the other of the lobes 62 and 73 with the corresponding inner end of the sleeve 77 of the corresponding member 75. The normal spacing between each lobe and its adjacent sleeve is equivalent to opening the various radial ports in the valve bushing 39 to a maximum, i.e. 100 percent output flow rate.

It is also a feature of the present invention to provide means selectively operable for rendering the parallelogram linkage inoperative when it is desired to operate the servo valve 10 solely in response to an electrical input to the amplifier 98. This is accomplished by a lock-out device which is arranged on the valve body. The lock-out device is indicated generally at 116 and is shown as comprising two pistons, 117 and 118. These pistons are shown as slidingly arranged within a bushing 119 mounted within the valve body 38. The bushing 119 has a centrally arranged inwardly projecting annular rib 120 which provides a stop against which the inner ends of the pistons 117 and 118 can seat when the lock-out device is in an inoperative condition as shown in Fig. 3. The outer end faces of the pistons 117 and 118 are preferably exposed to the pressurized fluid of the secondary hydraulic system at all times so that these pistons are constantly urged to retract themselves into the valve body. The inner and opposing end faces of these pistons have a larger area than the outer faces thereof so that when pressurized fluid from the secondary hydraulic system is applied to the inner piston faces, the pistons will move outwardly so as to render the lock-out device operative.

The piston 117 is shown as having an outwardly extending stem 121 adapted to engage an adjustable abutment member 122 carried by the lever 79. Similarly, the piston 118 has an outwardly extending stem 123 adapted to engage an adjustable abutment member 124 carried by the lever 80. The inner end of the piston 118 has a coaxial stem 125 which is slidingly received in a recess 126 provided in the piston 117. The engagement between the outer end of this recess 126 and the stem 125 is sealed. The recess 126 is vented to the atmosphere by the channel 127. It is to be noted that the diameter of the stem 125 is less than the diameter of the stem 123 so that the inner end face of the piston 118 has a greater area than that of the outer end face. It is also to be noted that the diameter of the stem 121 is greater than the diameter of the stem 125 so that the area of the inner end face of the piston 117 is greater than that on its outer end face.

Means are provided for applying the pressurized fluid of the secondary hydraulic system to the space between the opposing inner end faces of the pistons 117 and 118 so as to drive these pistons outwardly and thereby render the lock-out device operative. Such means include a lock-out solenoid valve indicated generally at 128. The solenoid valve 128 is shown as having a similar construction to the shutoff solenoid valve 106, except that the solenoid valve 128 is a three-way valve. As shown in Fig. 3, the lock-out solenoid valve 128 is in its normal closed position, the coil of the valve not being energized. When in this deenergized position, the port of a branch fluid channel 129 leading from the fluid channel 107 is closed by the right hand lobe of the valve 128. However, in this position of the valve, the space between the inner and opposing end faces of the pistons 117 and 118 of the lock-out device are connected to the drain or return port 47 of the secondary hydraulic system. To this end, the lockout bushing 119 has a slot 130 which, at one end, communicates with the space between the pistons 117 and 118 and at its other end communicates with an annular groove 131 provided in the valve body 38. A fluid channel 132 communicates at one end with this annular groove 131 and at its other end with a port for the lock-out solenoid valve 128 which port remains open in all positions of this valve. Also, when the lock-out solenoid valve is in its normally closed position as shown, a fluid channel 133 connects an open port to this valve with an annular groove 134 provided in the valve body and surrounding the lock-out bushing 119. The groove 134 communicates with the fluid channel 94 via the fluid channel 135.

Thus, when the lock-out solenoid valve 128 is in its normally closed position as shown, the space between the lock-out pistons 117 and 118 is in communication with the return port 47 of the secondary hydraulic system, through the slot 130, annular groove 131, channel 132, valve 128, channel 133, annular groove 134, channel 135, channel 94, annular groove 65 and channel 67.

Figure 4:
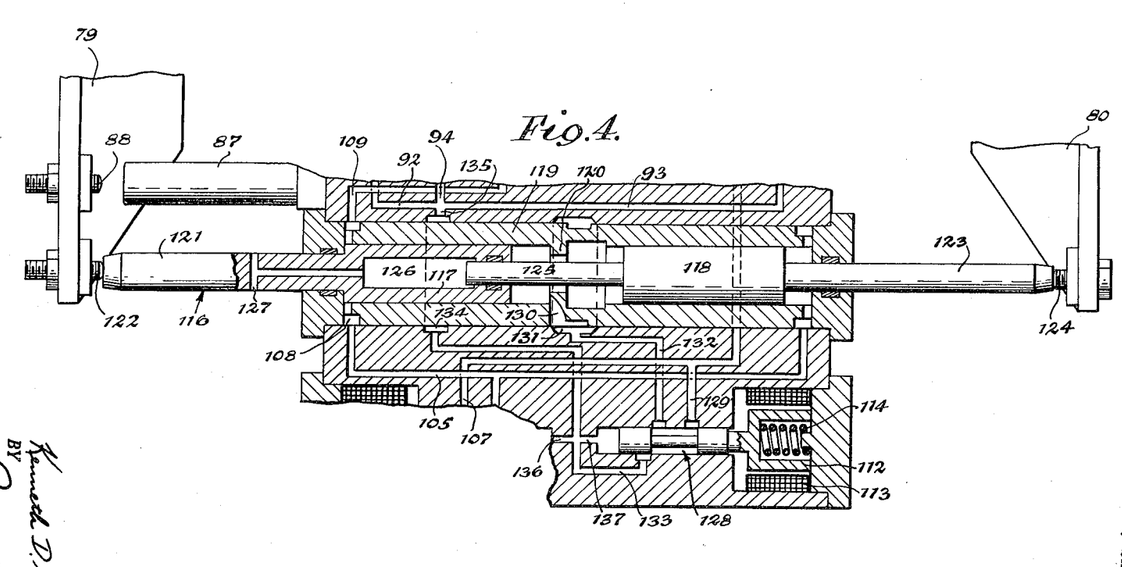
Fig. 4 is a fragmentary sectional view similar to Fig. 3 but showing the lock-out device in an operative condition.

However, when the lock-out solenoid valve 128 is energized, its two-lobed valve spool is moved to the right, as shown in Fig. 4. Such movement of the valve spool opens the port to the pressure channel 129 and closes off the port to the drain channel 133, thereby establishing communication between the pressure channel 129 and the channel 132. In this manner, pressurized fluid can be admitted through the channel 132, annular groove 131 and slot 130 into the space between the inner faces of the lock-out pistons 117 and 118. Inasmuch as the areas of these inner piston faces are greater than the areas of their outer faces, the pistons will be driven outwardly. The lock-out piston 117 moves until its outer end face engages the end wall so that the stem 121 is extended its maximum amount and adapted to engage the abutment member 122. The other lock-out piston 118 moves outwardly until its stem 123 engages the abutment member 124. If the parallelogram linkage is not in a centered position, the piston stems 121 and 123 will return the linkage to such a centered position as shown in Fig. 4. In this position, it will be noted that the outer end face of the lock-out piston 118 does not engage its end wall so that there is a constant pressure asserted by this piston against the parallelogram linkage.

In order to vent the inner ends of the cylinders for the valve spools of both solenoid valves 106 and 128, the cylinder for the shut-off solenoid valve 106 is shown as vented to the drain channel 133 via the channel 136, and the inner end of the cylinder for the valve spool of the lock-out solenoid valve 128 is shown as being similarly vented to the drain channel 133 via the channel 137.

Referring to Fig. 2, it is to be noted that the outer ends of the lock-out device pistons are always in communication with the pressure supply line of the secondary hydraulic system through the line 138. It is also to be noted that the shut-off solenoid valve 106 also controls the supply of pressurized fluid to the lock-out solenoid valve 128. In Fig. 2, the lock-out solenoid valve 128 is shown as arranged in the line 139 which is adapted to supply pressurized fluid from the line 107 to the space between the lock-out pistons. The drain line for the lock-out solenoid valve 128 is shown in Fig. 2 at 140 and connects with the main return line 16 of the secondary hydraulic system.

*Operation of servo valve when set up for dual input*

The setup for the servo valve for both mechanical and electrical input is illustrated in Fig. 3. In this condition of the valve, the lock-out device 116 is in its inoperative position shown. The shut-off solenoid valve 106 is energized as shown and the lock-out solenoid valve 128 is de-energized as shown. To effect this, referring to Fig. 1, the switch 37 is closed and the switch 34 is open.

If the input rod 25 is shifted to the left as viewed in Fig. 3, the linkage levers 79 and 80 will swing in a counterclockwise direction about their respective pivots. This will shift the members 75 to the right, each the same distance, the extent of such distance or displacement being proportionate to the amount of movement of the input rod 25. Since the frictional resistance to movement of the valve spool 14 is negligible, the members 75, through the intermediary of the springs 78, mechanically drive the valve spool to the right without varying any final loading on the springs and displace the valve spool the same distance which the members 75 have been displaced.

In the primary hydraulic system, this causes the pressure port 42 to communicate with the actuating port 44, and the other actuating port 45 to communicate with the return port 43. Thus, pressurized hydraulic fluid, metered proportionate to the mechanical displacement of the valve spool 41, will be admitted to the left of piston 21 in the external hydraulic machinery through the line 13 and the fluid to the right of this piston can drain to the return line of the primary hydraulic system through the line 14.

As to the secondary hydraulic system, shifting the valve spool to the right operates to place the pressure port 46 in communication with the actuating port 48, and the other actuating port 49 in communication with the return port 47. Thus, pressurized fluid will be applied to the left face of the piston 20 through the line 17 and fluid to the right of this piston can be returned through the line 18 to the drain of the secondary hydraulic system.

While this is going on as a result of pure mechanical displacement of the valve spool 41, it will be seen that this valve spool can have an additional movement either to the right or to the left as a result of the hydraulic drive to this spool controlled by the electro-hydraulic amplifier 98. If the valve spool is moved farther to the right, a greater metering of fluid flow in the two hydraulic systems through their respective actuating ports results. On the other hand, if the electrically induced hydraulic drive causes the valve spool to move to the left, the fluid metered by the valve will be reduced. In either event, it will be seen that the output flow rate of the valve is proportionate to the algebraic sum of the mechanical and electrical inputs.

Now assuming that the input rod 25 is shifted to the right, the levers 79 and 80 of the mechanical input linkage will swing in a clockwise direction about their respective pivots so as to shift the valve spool to the left. Assuming that this occurs beginning with the valve spool in a centered position as shown in Fig. 3, it will be seen that, as to the primary hydraulic system, the actuating port 45 will communicate with the pressure port 42, and the actuating port 44 will communicate with the return port 43. Likewise, in the secondary hydraulic system, the actuating port 49 will communicate with the pressure port 46, and the actuating port 48 will communicate with the return port 47. Under such conditions, pressurized fluid will be introduced into the external hydraulic machinery through the actuating lines 18 and 14 and drained from such machinery through the actuating lines 17 and 13.

In the same manner as described above, an electrically induced hydraulic drive can be imposed on the mechanical input drive so that again, the output flow rate of the servo valve is directly proportionate to the algebraic sum of the mechanical and electrical inputs. Thus, in this flight regime there is limited electrical authority for stabilization purposes.

Provision for pilot override of maximum electrical input valve displacement is provided during this flight regime by limiting spool displacement relative to the mechanical input system to the displacement equivalent to full output flow, whereas the stops which limit the mechanical input itself are limited to a travel equivalent to 200 percent full output flow. Therefore, the pilot can counteract full electrical hard-over signal and achieve 100 percent rated flow in the opposite direction, should he so desire.

In this connection it is to be noted that if foreign material should prevent motion of the valve spool 41 while the input rod 25 continues to be displaced, the sleeve 77 of one movable member 75 bottoms against the corresponding end of the valve spool after a motion equivalent to rated output flow of the servo valve. When so bottomed out direct drive from the mechanical input rod is applied to the valve spool. It is extremely unlikely that such a force level would ever be required, but it is available in case of emergency need.

It is preferred to incorporate suitable filtering means in various places in the hydraulic system of the servo valve to maintain the hydraulic fluid free of foreign material. Such filtering means have not been illustrated in order to simplify the showing of the essentials of the valve.

*Operation of servo valve when set up solely for mechanical input*

To operate the servo valve so that it will be responsive solely to mechanical input, the shut-off solenoid valve 106 is de-energized. This is accomplished by opening the switch 37 (Fig. 1). Referring to Fig. 3, the shut-off valve spool will then shift to the right and close off the port to the fluid channel 107 and thereby the electro-hydraulic amplifier 98 will receive no fluid and cannot operate to produce a pressure differential in the fluid channels 96 and 97. Hence, there can be no hydraulic drive on the valve spool 41. In this condition the valve will respond solely to the mechanical linkage input within the limits provided by the stops 86 and 87. Under this flight regime there is no electrical authority over the servo valve.

It is to be noted that an infinitely variable mechanical centering adjustment in the mechanical input linkage permits very precise centering adjustments of the servo control valve spool 41. The linkage utilizes the spool return springs to preload all free play or slop out of the input linkage. The spring forces and hydraulic drive forces which preload the input linkage do not exert any externally apparent force on the mechanical input rod 25.

*Operation of servo valve when set up solely for electrical input*

To operate the servo valve so that it will be responsive solely to electrical input, the shut-off solenoid valve 106 and the lock-out solenoid valve 128 are energized. This is accomplished by closing the switches 37 and 34. The fluid supply to the lock-out solenoid valve is from the shut-off solenoid valve so that the lock-out device cannot be engaged unless the electrical drive system is functioning.

Referring to Fig. 3, the spool of the shut-off valve 106 will assume the position there shown to establish communication between the channels 105 and 107. Referring to Fig. 4, the lock-out valve spool will assume the position there shown to establish communication between the channels 129 and 132. The lock-out pistons 117 and 118 are thus driven to their outer positions to return the mechanical input linkage to a centered position and maintain it there in a locked out condition, as shown in Fig. 4. The linkage is held in this centered position against any force up to a predetermined maximum.

In this flight regime, the electrical input has full authority. However, it is to be noted that the lock-out device is so constructed that the pilot can overpower the lock-out pistons in the event of any failure of the solenoid turn-off system.

When the lock-out device is desired to be rendered inoperative again, the switch 34 (Fig. 1) is opened which discontinues the energizing voltage to the coil of the lock-out solenoid valve. This transfers the connection of the space between the lock-out pistons from the pressure line to the return line of the secondary hydraulic system and the lock-out device is restored from the operative position shown in Fig. 4 to the inoperative position shown in Fig. 3.

It should be noted that the electrically created spool driving pressures are internal within the servo valve linkage system only. No reaction force as a result of the hydraulic drive or springs is reflected back to the system mechanical input rod 25.

In the event that system pressure is lost to either section of the valve spool 41 in a dual hydraulic system as shown, means (not shown) such as by-pass valves may be provided for interconnecting the corresponding actuating ports 44, 48 and 45, 49 of the two hydraulic systems.

For higher power requirements of the servo valve, larger valve spool diameters are utilized. Also, if desired, pressure repeating power amplifiers (not shown) may be interposed between the nozzles and spool end drive chambers.

From the foregoing, it will be seen that the fundamental purpose of the present invention is achieved by providing, in its preferred embodiment, a servo valve having a slide valve spool positioned proportionate to the sum of two inputs, one mechanical and the other electrical. The slide valve may carry either a single valving section or two independent section spools for dual hydraulic systems. Whether there are one or two sections, they are fabricated on a single valve spool so that their continued perfect alignment with respect to each other under all operating conditions is maintained. This spool is carried between two opposed preloaded compression springs. The main slide valve spool is displaced by the mechanical input linkage through these high rate preloaded spool return springs. The balanced nozzle hydraulic amplifier supplies an additional driving force to the spool end areas. This force acts against the spool return springs and thereby causes an incremental valve spool displacement proportionate to the electrical signal into the first stage hydraulic amplifier. Therefore, the final valve spool position is the algebraic sum of the two inputs, mechanical and electrical.

I claim:

1. A dual input servo valve, comprising a body, a chamber in said body having inlet, outlet and actuating ports for receiving and supplying fluid from and to external hydraulic machinery to be actuated, a valve spool slidably arranged in said chamber, said spool having lobes positioned to prevent communication between said ports when said spool is in a centered position, a member arranged in said chamber at each end of said spool and movable axially thereof, spring means operatively interposed between each of said movable members and the corresponding end of said spool for urging said spool to a predetermined position relative to said movable members, fluid channels for conducting fluid to and from the ends of said spool whereby said spool can be driven hydraulically from said predetermined position against the urging of said spring means, and means for moving said members axially of said spool in the same direction and a like distance whereby said spool can be driven mechanically, such means comprising a parallelogram linkage including a pair of levers severally associated with said movable members and an input rod for actuating said linkage, the displacement of said spool relative to said body being responsive to the algebraic sum of the deflection of said spring means due to hydraulic drive on said spool and the mechanical displacement of said movable members.

2. A dual input servo valve, comprising a body, a chamber in said body having inlet, outlet and actuating ports for receiving and supplying fluid from and to external hydraulic machinery to be actuated, a valve spool slidably arranged in said chamber, said spool having lobes positioned to prevent communication between said ports when said spool is in a centered position, a member arranged in said chamber at each end of said spool and movable axially thereof, spring means operatively interposed between each of said movable members and the corresponding end of said spool for urging said spool to a predetermined position relative to said movable members, fluid channels for conducting fluid to and from the ends of said spool whereby said spool can be driven hydraulically from said predetermined position against the urging of said spring means, means for moving said members axially of said spool in the same direction and a like distance whereby said spool can be driven mechanically, such means comprising a parallelogram linkage including a pair of levers severally associated with said movable members and an input rod for actuating said linkage, the displacement of said spool relative to said body being responsive to the algebraic sum of the deflection of said spring means due to hydraulic drive on said spool and the mechanical displacement of said movable members, and a lock-out device selectively operable to place and maintain said linkage in a predetermined position.

3. A dual input servo valve as set forth in claim 2, in which said lock-out device is hydraulically operated and arranged on said body and prevents actuation of said linkage until a predetermined force is applied to said input rod.

4. A dual input servo valve, comprising a body, a chamber in said body having inlet, outlet and actuating ports for receiving and supplying fluid from and to external hydraulic machinery to be actuated, a valve spool slidably arranged in said chamber, said spool having lobes positioned to prevent communication between said ports when said spool is in a centered position, a member arranged in said chamber at each end of said spool and movable axially thereof, spring means operatively interposed between each of said movable members and the corresponding end of said spool for urging said spool to a predetermined position relative to said movable members, fluid channels for conducting fluid to and from the ends of said spool whereby said spool can be driven hydraulically from said predetermined position against the urging of said spring means, electro-hydraulic input means associated with said channels and arranged when supplied with fluid to produce an output pressure differential in said channels to drive said spool proportionate to the electrical signal applied, mechanical input means for moving said members axially of said spool in the same direction and a like distance whereby said spool can be driven mechanically, the displacement of said spool relative to said body being responsive to the algebraic sum of the deflection of said spring means due to hydraulic drive on said spool and the mechanical displacement of said movable members and hence the output flow rate through said actuating ports is proportionate to the algebraic sum of the electrical and mechanical inputs to the valve, means selectively operable for shutting off the supply of fluid to said electro-hydraulic input means whereby the valve is rendered responsive solely to mechanical input, and means selectively operable for rendering said mechanical input means inoperative whereby the valve is responsive solely to electrical input.

5. A dual input servo valve, comprising a body, a pressurized fluid supply line, a fluid return line, a chamber in said body having inlet, outlet and actuating ports, said inlet port communicating with said supply line, said outlet port communicating with said return line, said actuating ports being alternately adapted to be placed in communication with said inlet and outlet ports for supplying and receiving fluid to and from external hydraulic machinery to be actuated, a valve spool slidably arranged in said chamber, said spool having lobes positioned to prevent communication between said ports when said spool is in a centered position, a member arranged in said chamber at each end of said spool and movable axially thereof, spring means operatively interposed between each of said movable members and the corresponding end of said spool for urging said spool to a predetermined position relative to said movable members, electro-hydraulic input means, a branch line connecting said supply line with said electro-hydraulic input means for supplying fluid thereto, fluid channels connected to said electro-hydraulic input means for conducting fluid to and from the ends of said spool whereby said spool can be driven hydraulically from said predetermined position against the urging of said spring means, said electro-hydraulic input means when supplied with fluid being arranged to produce an output pressure differential in said channels to drive said spool proportionate to the electrical signal applied, mechanical input means for moving said members axially of said spool in the same direction and a like distance whereby said spool can be driven mechanically, the displacement of said spool relative to said body being responsive to the algebraic sum of the deflection of said spring means due to hydraulic drive on said spool and the mechanical displacement of said movable members and hence the output flow rate through said actuating ports is proportionate to the algebraic sum of the electrical and mechanical inputs to the valve, means associated with said branch line and selectively operable to shut off the flow of fluid through said branch line whereby the valve is rendered responsive solely to mechanical input.

6. A dual input servo valve, comprising a body, a pressurized fluid supply line, a fluid return line, a chamber in said body having inlet, outlet and actuating ports, said inlet port communicating with said supply line, said outlet port communicating with said return line, said actuating ports being alternately adapted to be placed in communication with said inlet and outlet ports for supplying and receiving fluid to and from external hydraulic machinery to be actuated, a valve spool slidably arranged in said chamber, said spool having lobes positioned to prevent communication between said ports when said spool is in a centered position, a member arranged in said chamber at each end of said spool and movable axially thereof, spring means operatively interposed between each of said movable members and the corresponding end of said spool for urging said spool to a predetermined position relative to said movable members, electro-hydraulic input means receiving fluid from said supply line, fluid channels connected to said means for conducting fluid to and from the ends of said spool whereby said spool can be driven hydraulically from said predetermined position against the urging of said spring means, said electro-hydraulic input means being arranged to produce an output pressure differential in said channels to drive said spool proportionate to the electrical signal applied, mechanical input means for moving said members axially in the same direction and a like distance whereby said spool can be driven mechanically, the displacement of said spool relative to said body being responsive to the algebraic sum of the deflection of said spring means due to hydraulic drive on said spool and the mechanical displacement of said movable members and hence the output flow rate through said actuating ports is proportionate to the algebraic sum of the electrical and mechanical inputs to the valve, and hydraulically actuated means employing the pressure of the fluid in said supply line and selectively operable for placing and maintaining said mechanical input means in a predetermined inoperative condition whereby the valve is responsive solely to electrical input.

7. A dual input servo valve, comprising a body, a pressurized fluid supply line, a fluid return line, a chamber in said body having inlet, outlet and actuating ports, said inlet port communicating with said supply line, said outlet port communicating with said return line, said actuating ports being alternately adapted to be placed in communication with said inlet and outlet ports for supplying and receiving fluid to and from external hydraulic machinery to be actuated, a valve spool slidably arranged in said chamber, said spool having lobes positioned to prevent communication between said ports when said spool is in a centered position, a member arranged in said chamber at each end of said spool and movable axially thereof, spring means operatively interposed between each of said movable members and the corresponding end of said spool for urging said spool to a predetermined position relative to said movable members, electro-hydraulic input means, a branch line connecting said supply line with said electro-hydraulic input means for supplying fluid thereto, fluid channels connected to said electro-hydraulic input means for conducting fluid to and from the ends of said spool whereby said spool can be driven hydraulically from said predetermined position against the urging of said spring means, said electro-hydraulic input means when supplied with fluid being arranged to produce an output pressure differential in said channels to drive said spool proportionate to the electrical signal applied, mechanical input means for moving said members axially of said spool in the same direction and a like distance whereby said spool can be driven mechanically, said mechanical input means comprising a parallelogram linkage including a pair of levers severally associated with said movable members and an input rod for actuating said linkage, the displacement of said spool relative to said body being responsive to the algebraic sum of the deflection of said spring means due to hydraulic drive on said spool and the mechanical displacement of said movable members and hence the output flow rate through said actuating ports is proportionate to the algebraic sum of the electrical and mechanical inputs to the valve, a selectively operable shut-off solenoid valve in said branch line, and double piston type lock-out device interposed between said levers, the areas on the inner and opposing faces of said pistons being greater than on their outer and remote faces, said outer piston faces at all times being in communication with said supply line, a selectively operable lockout solenoid valve arranged alternately to place said inner piston faces in communication with said branch line on the downstream side of said shut-off solenoid valve or with said return line and operative when said inner piston faces communicate with said return line to hold said pistons in a retracted position out of engagement with said levers thereby rendering said linkage actuatable but alternately operative when said inner faces communicate with said branch line to spread said pistons into engagement with said levers thereby rendering said linkage inactuatable.

8. A dual input servo valve, comprising a body, a chamber in said body having inlet, outlet and actuating ports for receiving and supplying fluid from and to external hydraulic machinery to be actuated, a valve spool slidably arranged in said chamber, said spool having lobes positioned to prevent communication between said ports when said spool is in a centered position, a member arranged in said chamber at each end of said spool and movable axially thereof, spring means operatively interposed between each of said movable members and the corresponding end of said spool for urging said spool to a predetermined position relative to said movable members, fluid channels for conducting fluid to and from the ends of said spool whereby said spool can be driven hydraulically from said predetermined position against the urging of said spring means, electro-hydraulic input means associated with said channels and arranged to produce an output differential in said channels to drive said spool proportionate to the electrical signal applied, mechanical input means for moving said members axially of said spool in the same direction and a like distance whereby said spool can be driven mechanically, the displacement of said spool relative to said body being responsive to the algebraic sum of the deflection of said spring means due to hydraulic drive on said spool and the mechanical displacement of said movable members and hence the output flow rate through one of said actuating ports is proportionate to the algebraic sum of the electrical and mechanical inputs to the valve, stop means limiting displacement of said spool relative to said members to the displacement equivalent to full output flow, and stop means limiting the movement of said mechanical input means to a travel equivalent to at least twice full output flow, whereby full output flow through one of said actuating ports due to maximum electrical input to drive the spool in one direction can be counteracted by mechanical input in the opposite direction to provide full output flow through the other of said actuating ports.

9. A dual input servo valve, comprising a body, a chamber in said body having inlet, outlet, and actuating ports for receiving and supplying fluid from and to external hydraulic machinery to be actuated, a valve spool slidably arranged in said chamber, said spool having lobes positioned to prevent communication between said ports when said spool is in a centered position, fluid channels or conducting fluid to and from the ends of said spool, electro-hydraulic input means associated with said channels and arranged when supplied with fluid to produce an output pressure differential in said channels to drive said spool proportionate to the electrical signal applied, yielding means arranged to resist movement of said spool when the same is driven hydraulically, means for mechanically shifting the position of said yielding means relative to said body without varying the final loading on said yielding means whereby said spool can be driven mechanically, the displacement of said spool relative to said body being responsive to the algebraic sum of the hydraulically and mechanically induced displacements of said spool and hence the output flow rate through said actuating ports is proportionate to the algebraic sum of the electrical and mechanical inputs to the valve, means selectively operable for shutting off the supply of fluid to said electro-hydraulic input means whereby the valve is rendered responsive solely to mechanical input, and means selectively operable for rendering said mechanical input means inoperative whereby the valve is responsive solely to electrical input.

10. A dual input servo valve, comprising a body, a pressurized fluid supply line, a fluid return line, a chamber in said body having inlet, outlet and actuating ports, said inlet port communicating with said supply line, said outlet port communicating with said return line, actuating ports being alternately adapted to be placed in communication with said inlet and outlet ports for supplying and receiving fluid to and from external hydraulic machinery to be actuated, a valve spool slidably arranged in said chamber, said spool having lobes positioned to prevent communication between said ports when said spool is in a centered position, yielding means arranged to resist movement of said spool when the same is driven hydraulically, means for mechanically shifting the position of said yielding means relative to said body without varying the final loading on said yielding means whereby said spool can be driven mechanically, electro-hydraulic input means, a branch line connecting said supply line with said electro-hydraulic input means for supplying fluid thereto, fluid channels connected to said electro-hydraulic input means for conducting fluid to and from the ends of said spool whereby said spool can be driven hydraulically against the urging of said yielding means, said electro-hydraulic input means when supplied with fluid being arranged to produce an output pressure differential in said channels to drive said spool proportionate to the electrical signal applied, the displacement of said spool relative to said body being responsive to the algebraic sum of the hydraulically and mechanically induced displacements of said spool and hence the output flow rate through said actuating ports is proportionate to the algebraic sum of the electrical and mechanical inputs to the valve, means associated with said branch line and selectively operable to shut off the flow of fluid through said branch line whereby the valve is rendered responsive solely to mechanical input.

11. A dual input servo valve, comprising a body, a pressurized fluid supply line, a fluid return line, a chamber in said body having inlet, outlet and actuating ports, said inlet port communicating with said supply line, said outlet port communicating with said return line, said actuating ports being alternately adapted to be placed in communication with said inlet and outlet ports for supplying and receiving fluid to and from external hydraulic machinery to be actuated, a valve spool slidably arranged in said chamber, said spool having lobes positioned to prevent communication between said ports when said spool is in a centered position, yielding means arranged to resist movement of said spool when the same is driven hydraulically, means for mechanically shifting the position of said yielding means relative to said body without varying the final loading on said yielding means whereby said spool can be driven mechanically, electro-hydraulic input means, a branch line connecting said supply line with said electro-hydraulic input means for supplying fluid thereto, fluid channels connected to said electro-hydraulic input means for conducting fluid to and from the ends of said spool whereby said spool can be driven hydraulically against the urging of said yielding means, said electro-hydraulic input means when supplied with fluid being arranged to produce an output pressure differential in said channels to drive said spool proportionate to the electrical signal applied, the displacement of said spool relative to said body being responsive to the algebraic sum of the hydraulically and mechanically induced displacements of said spool and hence the output flow rate through said actuating ports is proportionate to the algebraic sum of the electrical and mechanical inputs to the valve, and hydraulically actuated means employing the pressure of the fluid in said supply line and selectively operable for placing and maintaining said mechanical input means in a predetermined inoperative condition whereby the valve is responsive solely to electrical input.

12. A dual input servo valve, comprising a body, a chamber in said body having inlet, outlet and actuating ports for receiving and supplying fluid from and to external hydraulic machinery to be actuated, a valve spool slidably arranged in said chamber, said chamber having lobes positioned to prevent communication between said ports when said spool is in a centered position, fluid channels for conducting fluid to and from the ends of said spools, electro-hydraulic input means associated with said channels and arranged to produce an output pressure differential in said channels to drive said spool proportionate to the electrical signal applied, yielding means arranged to resist movement of said spool when the same is driven hydraulically, mechanical input means for shifting the position of said yielding means relative to said body without varying the final loading on said yielding means whereby said spool can be driven mechanically, the displacement of said spool relative to said body being responsive to the algebraic sum of the hydraulically and mechanically induced displacements of said spool and hence the output flow rate through said actuating ports is proportionate to the algebraic sum of the electrical and mechanical inputs to the valve, stop means limiting displacement of said spool relative to said mechanical input means to the displacement equivalent to full output flow, and stop means limiting the movement of said mechanical input means to a travel equivalent to at least twice full output flow, whereby full output flow through one of said actuating ports due to maximum electrical input to drive the spool in one direction can be counteracted by mechanical input in the opposite direction to provide full output flow through the other of said actuating ports.

13. A dual input servo valve for accepting either mechanical or electrical inputs or both simultaneously, comprising a body, a chamber in said body having inlet, outlet and actuating ports for receiving and supplying fluid from and to external hydraulic machinery to be actuated, a valve spool slidably arranged in said chamber, said spool having lobes positioned to prevent communication between said ports when said spool is in a centered position, a member arranged in said chamber at each end of said spool and movable axially thereof, spring means operatively interposed between each of said movable members and the corresponding end of said spool for urging said spool to a predetermined position relative to said movable members, fluid channels for conducting fluid to and from the ends of said spool whereby said spool can be driven hydraulically from said predetermined position against the urging of said spring means, electro-hydraulic input means associated with said channels and arranged to produce an output pressure differential in said channels to drive said spool proportionate to the electrical signal applied, any such pressure differential displacing said spool from its said predetermined position by an amount sufficient to establish a force balance with said spring means, and mechanical input means for moving said members axially of said spool in the same direction and a like distance whereby said spool can be driven mechanically, the displacement of said spool relative to said body being responsive to the algebraic sum of the deflection of said spring means due to hydraulic drive on said spool and the mechanical displacement of said movable members and hence the output flow rate through said actuating ports is proportionate to the algebraic sum of the electrical and mechanical inputs to the valve.

14. A dual input servo valve for accepting either mechanical or electrical inputs or both simultaneously, comprising a body, a chamber in said body having inlet, outlet and actuating ports for receiving and supplying fluid from and to external hydraulic machinery to be actuated, a valve spool slidably arranged in said chamber, said spool having lobes positioned to prevent communication between said ports when said spool is centered in said chamber, return spring means for said spool, means for mechanically shifting said return spring means relative to said body without varying the loading on said return spring means whereby said spool can be mechanically driven, and means for hydraulically driving said spool against the urging of said return spring means including fluid channels for conducting fluid to and from surfaces on said spool which face axially and in opposite directions and electro-hydraulic input means associated with said channels and arranged to produce an output pressure differential in said channels to drive said spool proportionate to the electrical signal applied, any such pressure differential displacing said spool from its said predetermined position by an amount sufficient to establish a force balance with said spring means, the displacement of said spool relative to said body and hence the output flow rate of the valve being responsive to the algebraic sum of the electrical and mechanical inputs.

References Cited in the file of this patent

UNITED STATES PATENTS

| | | |
|---|---|---|
| 2,365,075 | Hassman | Dec. 12, 1944 |
| 2,654,348 | Beck | Oct. 6, 1953 |
| 2,678,117 | Chenery | May 11, 1954 |
| 2,679,209 | Fischer | May 25, 1954 |
| 2,705,940 | Edwards | Apr. 12, 1955 |
| 2,767,689 | Moog | Oct. 23, 1956 |
| 2,773,660 | Rasmussen | Dec. 11, 1956 |
| 2,800,143 | Keller | July 23, 1957 |
| 2,804,883 | Curlett | Sept. 3, 1957 |